J. M. Brahm.

Upsetting Tires.

N° 36,504. Patented Sept. 23, 1862.

Witnesses;
J. W. Combs
G. W. Reed

Inventor;
John M. Brahm
per Munn & Co
Attorneys

United States Patent Office.

JOHN M. BRAHN, OF RED BANK, NEW JERSEY.

IMPROVEMENT IN MACHINES FOR UPSETTING TIRES.

Specification forming part of Letters Patent No. 36,504, dated September 23, 1862.

*To all whom it may concern:*

Be it known that I, JOHN M. BRAHN, of Red Bank, in the county of Monmouth and State of New Jersey, have invented a new and Improved Device for Shrinking or Upsetting Tires for the Wheels of Vehicles; and I do hereby declare that the following is a full, clear, and exact description of the same, reference being had to the accompanying drawings, making a part of this specification, in which—

Figure 1:
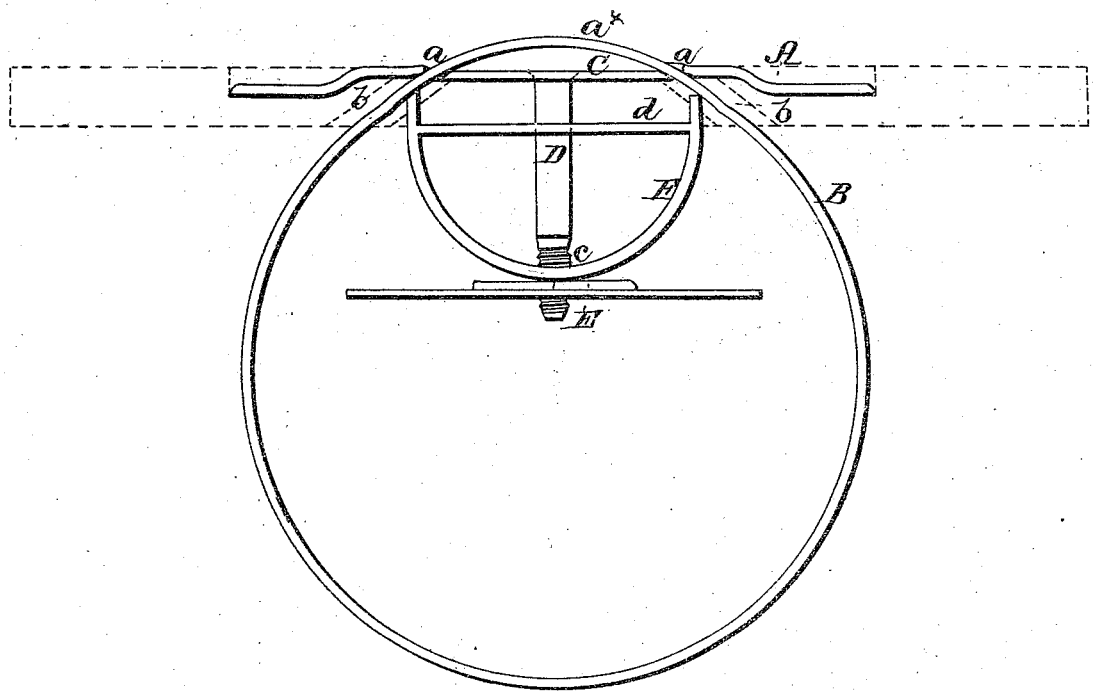
Figure 2:
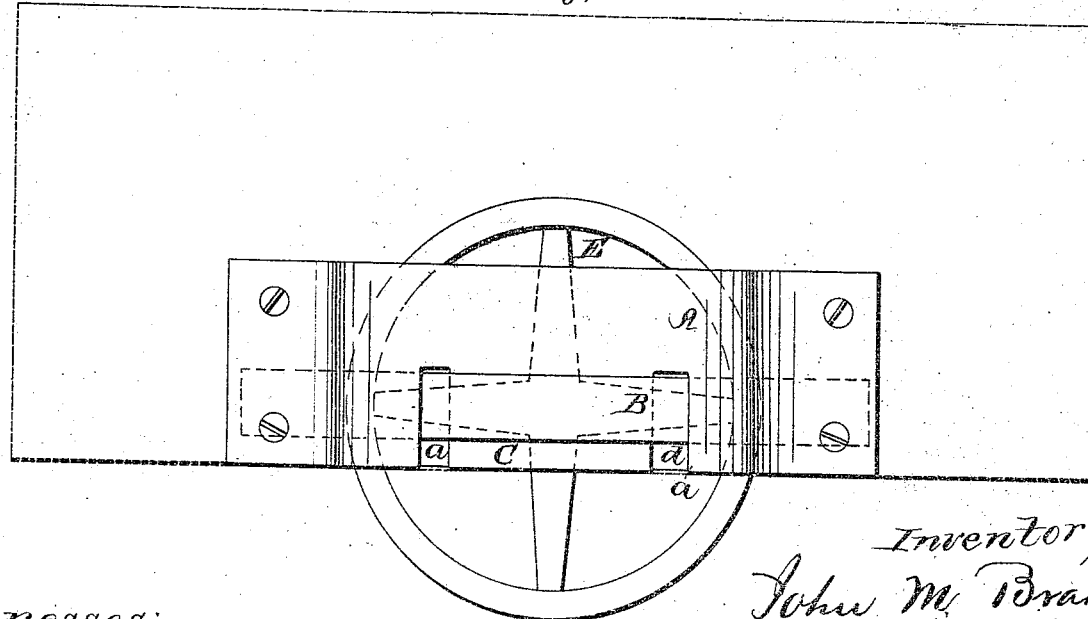

Figure 1 is a front view of my invention; Fig. 2, a plan or top view of the same.

Similar letters of reference indicate corresponding parts in the two figures.

This invention consists in the employment or use of a clamp and bed-plate arranged in such a manner that the heated portion of the tire may by a single manipulation be firmly secured in position over the bed-plate, so that the former may be hammered down upon the bed-plate and contracted as desired.

The object of the invention is to obtain a simple, efficient, and economical device for the purpose specified—one that may be constructed and operated by any ordinary blacksmith, or one not an expert or overskilled in the art.

To enable those skilled in the art to fully understand and construct my invention, I will proceed to describe it.

A represents a plate of wrought-iron, which may be of rectangular form and of any suitable dimensions. This plate has two parallel recesses or slots, $a\ a$, made in it transversely and extending from its front edge inward to a line about at its center, as shown in Fig. 2.

The plate A is secured firmly to the front edge of a bench or any proper support, the front edge of the plate being flush with the front edge of the bench, and in the front edge of the latter there are made two oblique slots, $b\ b$, having such an inclination that they may receive the tire B. This will be fully understood by referring to Fig. 1, in which the bench is shown in red outline. The slots $b\ b$ are in line with the recesses or slots $a\ a$ in the plate A, the tire, when adjusted in the device, fitting in the latter as well as in the former.

The portion C of the bed-plate between the recesses or slots $a\ a$ has a pendent rod, D, attached, on the lower part of which a screw, $c$, is cut to receive a nut, E, which may be in the form of a wheel and of sufficient diameter to enable the operator to have a requisite purchase or leverage power to work the device with facility.

F is an upright semicircular bar, through the lower part of which the rod D passes, the nut E being below it. This bar F has a bar, $d$, attached to it near its ends, which serves as a stay for the same, the rod D passing through it. The ends of the bar F are underneath the outer edges of the recesses or slots $a\ a$, as shown in Fig. 1, and said bar is constructed of wrought-iron.

The operation is as follows: The tire to be operated upon is heated at the proper or desired point and the nut E is turned so as to let down the semicircular bar F sufficiently far to admit of the tire B being adjusted laterally in the slots $b\ b$ of the bench and the recesses or slots $a\ a$ of the plate A, the heated portion $a^\times$ of the tire being directly over the part C of the bed-plate. The operator then screws up the nut E, and thereby raises the semicircular bar F until the tire B at each side of the heated portion $a^\times$ is firmly clamped between the upper edges of the semicircular bar F and the outer edges of the recesses or slots $a\ a$. The heated portion $a^\times$ is then hammered down on the part C of the plate A, and is consequently contracted or shrunk, the contraction, of course, being equal to the difference in length between the part $a^\times$ before the same is flattened and said part after it is flattened. After this operation is performed the nut E is turned down or unscrewed, so as to let down the semicircular bar F and release the tire, which is then removed from the device and the flattened part $a^\times$ curved again by a few blows of the hammer, so that it will correspond with the rest of the curvature of the tire, and the work is completed.

In order to vary the degree of contraction in different tires, the part $a^\times$ may be more or less curved or bent with the hammer before being adjusted in the device. The greater the curvature in said part, of course the greater will be the contraction.

This device, although comparatively simple and inexpensive, may be operated with greater facility than many of the more pretentious machines devised for the same purpose. It can be made by any ordinary blacksmith and operated by an apprentice or ordinary hand without any difficulty whatever and the work performed in a proper manner.

Having thus described my invention, what I claim as new, and desire to secure by Letters Patent, is—

The bed-plate A, provided with parallel recesses or slots $a\ a$, in combination with the bar F, screw-rod D, and nut E, or an equivalent means to operate said bar, as and for the purpose herein set forth.

JOHN M. BRAHN.

Witnesses:
  ROBERT B. HAYWARD,
  FRANCIS H. LITTLE.